(12) United States Patent
Maher et al.

(10) Patent No.: US 9,448,095 B2
(45) Date of Patent: Sep. 20, 2016

(54) VOLUME METERING DISPENSER

(71) Applicant: David S. Smith America, Inc., Lester Prairie, MN (US)

(72) Inventors: Michael D. Maher, Hutchinson, MN (US); Bradley L. Trettin, Buffalo Lake, MN (US); Loren L. Brelje, Glencoe, MN (US)

(73) Assignee: David S. Smith America, Inc., Lester Prairie, MN (US)

( * ) Notice: Subject to any disclaimer, the term of this patent is extended or adjusted under 35 U.S.C. 154(b) by 0 days.

(21) Appl. No.: 14/386,159

(22) PCT Filed: Mar. 15, 2013

(86) PCT No.: PCT/US2013/032207
§ 371 (c)(1),
(2) Date: Sep. 18, 2014

(87) PCT Pub. No.: WO2013/142345
PCT Pub. Date: Sep. 26, 2013

(65) Prior Publication Data
US 2015/0069094 A1    Mar. 12, 2015

Related U.S. Application Data

(60) Provisional application No. 61/612,661, filed on Mar. 19, 2012.

(51) Int. Cl.
*B67D 3/00*        (2006.01)
*G01F 11/12*       (2006.01)
(Continued)

(52) U.S. Cl.
CPC .............. *G01F 11/12* (2013.01); *B65D 11/22* (2013.01); *B65D 21/0209* (2013.01); *B65D 83/0094* (2013.01); *G01F 11/263* (2013.01)

(58) Field of Classification Search
CPC .................. F16K 21/04; G01F 11/12
USPC ............ 222/425, 436, 424.5, 444, 449, 484, 222/509, 511, 518, 482, 469, 485; 137/588
See application file for complete search history.

(56) References Cited

U.S. PATENT DOCUMENTS 1,375,430 A * 4/1921 Walker .......................... 222/447
1,693,720 A * 12/1928 Lyons ........................... 222/445
(Continued)

FOREIGN PATENT DOCUMENTS

FR        2507576        12/1982
WO        2008117250     10/2008
WO        2015/179614 A1 11/2015

OTHER PUBLICATIONS

Notification of Transmittal of the Transmittal Search Report and the Written Opinion of the International Searching Authority, or the Declaration for PCT Application No. PCT/US2013/032207 mailed Jun. 3, 2013.
(Continued)

*Primary Examiner* — Paul R Durand
*Assistant Examiner* — Charles P Cheyney
(74) *Attorney, Agent, or Firm* — Vidas, Arrett & Steinkraus, P.A.

(57) ABSTRACT

A volume metering dispenser comprises a body having a fluid cavity therein. The body further has a body wall, at least a portion of which is transparent or translucent, thereby permitting the operator to see the level of fluid within at least a portion of the fluid cavity. A valve is disposed within the body portion, the valve comprises a seal. The seal is selectively engaged to the body in order to selectively dispense fluid. The volume metering dispenser further comprises a resilient member. The resilient member is elastically deformable and the valve is attached to the resilient member.

15 Claims, 15 Drawing Sheets

(51) Int. Cl.
    *G01F 11/26*     (2006.01)
    *B65D 6/34*     (2006.01)
    *B65D 21/02*     (2006.01)
    *B65D 83/00*     (2006.01)

(56) References Cited

U.S. PATENT DOCUMENTS

| | | | |
|---|---|---|---|
| 2,659,518 A * | 11/1953 | Donnelly | 222/449 |
| 3,128,915 A * | 4/1964 | Matter | 222/156 |
| 3,191,820 A | 6/1965 | Kuster | |
| 3,595,445 A | 7/1971 | Buford | |
| 4,452,425 A | 6/1984 | Lucking | |
| 4,471,807 A | 9/1984 | Lucking et al. | |
| 4,475,566 A | 10/1984 | Haines | |
| 4,679,714 A * | 7/1987 | Blake | 222/449 |
| 4,958,749 A * | 9/1990 | Kuenzel | G01F 11/261 222/133 |
| 5,078,305 A * | 1/1992 | Glynn et al. | 222/442 |
| 5,337,775 A * | 8/1994 | Lane et al. | 137/68.29 |
| 6,068,371 A | 5/2000 | Wallace et al. | |
| 6,237,628 B1 * | 5/2001 | Miller | G01D 19/0063 137/588 |
| 6,401,752 B1 | 6/2002 | Blackbourn et al. | |
| 6,470,910 B2 * | 10/2002 | Blackbourn et al. | 137/588 |
| 6,648,186 B2 | 11/2003 | Roethel | |
| 7,726,525 B2 | 6/2010 | Nini | |
| 8,113,329 B2 | 2/2012 | Richards | |
| D676,320 S | 2/2013 | Richards et al. | |
| 8,402,999 B2 | 3/2013 | Nini | |
| 8,459,510 B2 | 6/2013 | Richards et al. | |
| 8,464,917 B2 | 6/2013 | Nini | |
| 8,517,229 B2 | 8/2013 | Nini | |
| 8,602,387 B2 | 12/2013 | Wrigley et al. | |
| 8,690,026 B2 | 4/2014 | Richards et al. | |
| 2009/0078721 A1 | 3/2009 | Hoffman | |
| 2010/0282345 A1 | 11/2010 | Richards | |
| 2011/0089191 A1 * | 4/2011 | Altonen | G01F 11/286 222/1 |
| 2011/0174842 A1 | 7/2011 | Nini | |
| 2012/0199615 A1 * | 8/2012 | O'Keefe et al. | 222/505 |
| 2013/0270305 A1 | 10/2013 | Richards et al. | |
| 2014/0076927 A1 | 3/2014 | Brooks | |
| 2015/0048111 A1 | 2/2015 | Bellmore | |
| 2015/0069094 A1 | 3/2015 | Maher | |

OTHER PUBLICATIONS

Performance dispensing for all types of packaging, Push Taps—DS Smith Plastics, available mid-Oct. 2013, http://www.dssmith.com/plastics/offering/flexible-packaging--dispensing-solutions/world-wide-dispensers/in-stock-solutions/push-taps/.

Goode, Finding Closure, Wines & Vines, Aug. 2008, http://www.winesandvines.com/template.cfm?content=57269&section=features.

* cited by examiner

VOLUME METERING DISPENSER

CROSS-REFERENCE TO RELATED APPLICATIONS

This Application is the National Stage entry of and claims priority to PCT Application No. PCT/US13/32207, filed Mar. 15, 2013, which claims priority to U.S. Provisional Application No. 61/612,661, filed Mar. 19, 2012, the entire contents of each of which are herein incorporated by reference.

STATEMENT REGARDING FEDERALLY SPONSORED RESEARCH

Not Applicable.

BACKGROUND OF THE INVENTION

Various types of fluid dispensers are known in the art. Dispensers used for dispensing detergent or other liquids, for example, can include a flexible push-button. The flexible push-button can, in some example, be used in conjunction with a valve to open and close the valve, thereby dispensing the detergent or other liquid.

In using such dispensers, it can be difficult for the operator to know how much detergent or other fluid has been dispensed, at least without having a separate measuring apparatus. Consequently, there remains a need for a fluid dispenser that informs the operator how much fluid is being dispensed.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

BRIEF SUMMARY OF THE INVENTION

In some embodiments, a fluid dispensing assembly comprises a body having therein a fluid cavity. In some embodiments, the body comprises a body wall. The body wall has at least a portion thereof that is transparent or translucent. The transparent or translucent portion permits an operator to see the level of fluid within at least a portion of the fluid cavity. The fluid dispensing assembly further comprises a valve disposed within the body portion. The valve comprises a seal and the seal is selectively engaged to the body. The fluid dispensing assembly further comprises a resilient member being elastically deformable. In some embodiments, the valve is attached to the resilient member.

In some embodiments, the valve further comprises a stem. At least a portion of the stem is engaged to the resilient member.

In some embodiments, the stem has a first opening therein.

In some embodiments, the stem has a second opening therein. The second opening is longitudinally offset from the first opening along the length of the stem.

In some embodiments, the stem comprises at least one guide member.

In some embodiments, the body comprises at least one guide channel. The at least one guide member is slidable within the at least one guide channel.

In some embodiments, the stem comprises a first recessed portion and a second recessed portion. In some embodiments, the second recessed portion is longitudinally offset from the first recessed portion along the length of the stem.

In some embodiments, the resilient member comprises a dome-shaped push button.

In some embodiments, the dome-shaped push button has an interior and an exterior. In some embodiments, the interior has a protruding member extending therefrom.

In some embodiments, the fluid dispensing assembly has closed configuration and a flow configuration.

In some embodiments, the fluid cavity defines a first chamber and a second chamber. In some embodiments, the first and second chambers are in fluid communication when the fluid dispensing assembly is in the closed configuration.

In some embodiments, the second chamber is isolated form the first chamber when the fluid dispensing assembly is in the flow configuration.

In some embodiments, the second chamber is vented when the fluid dispensing assembly is in the flow configuration.

In some embodiments, the body further defines a third chamber. In some embodiments, the second chamber vents through the third chamber when the fluid dispensing assembly is in the flow configuration.

In some embodiments, the second chamber is isolated from the third chamber when the fluid dispensing assembly is in the closed configuration.

In some embodiments, the invention is directed to a fluid dispensing assembly having a flow configuration and a closed configuration. The fluid dispensing assembly comprises a body having a fluid cavity. The body has a first chamber, a second chamber, and a body wall. The body wall extends along at least a portion of the second chamber and has at least a portion that is transparent or translucent such that the level of fluid within the second chamber is visible from outside of the second chamber. In some embodiments, the fluid dispensing assembly further comprises a valve disposed within the body. In some embodiments, the valve isolates the first chamber from the second chamber when the assembly is in the flow configuration. In some embodiments, the valve comprises a seal and a stem, the seal is selectively engaged to the body. In some embodiments, the assembly further comprises a resilient member. In some embodiments, the resilient member is elastically deformable. In some embodiments, the valve is attached to a portion of the stem.

In some embodiments, in the closed configuration, the first and second chambers are in fluid communication with one another.

In some embodiments, the valve has a first opening extending therethrough. In some embodiments, in the closed configuration, the first opening allows for fluid communication between the first and second chambers.

In some embodiments, the body has a third chamber. Further, in some embodiments, the second chamber is vented through the third chamber when the fluid dispensing assembly is in the flow configuration.

In some embodiments, the second chamber is vented through the first chamber when the assembly is in the closed configuration.

BRIEF DESCRIPTION OF THE SEVERAL VIEWS OF THE DRAWING(S)

Figure 1:
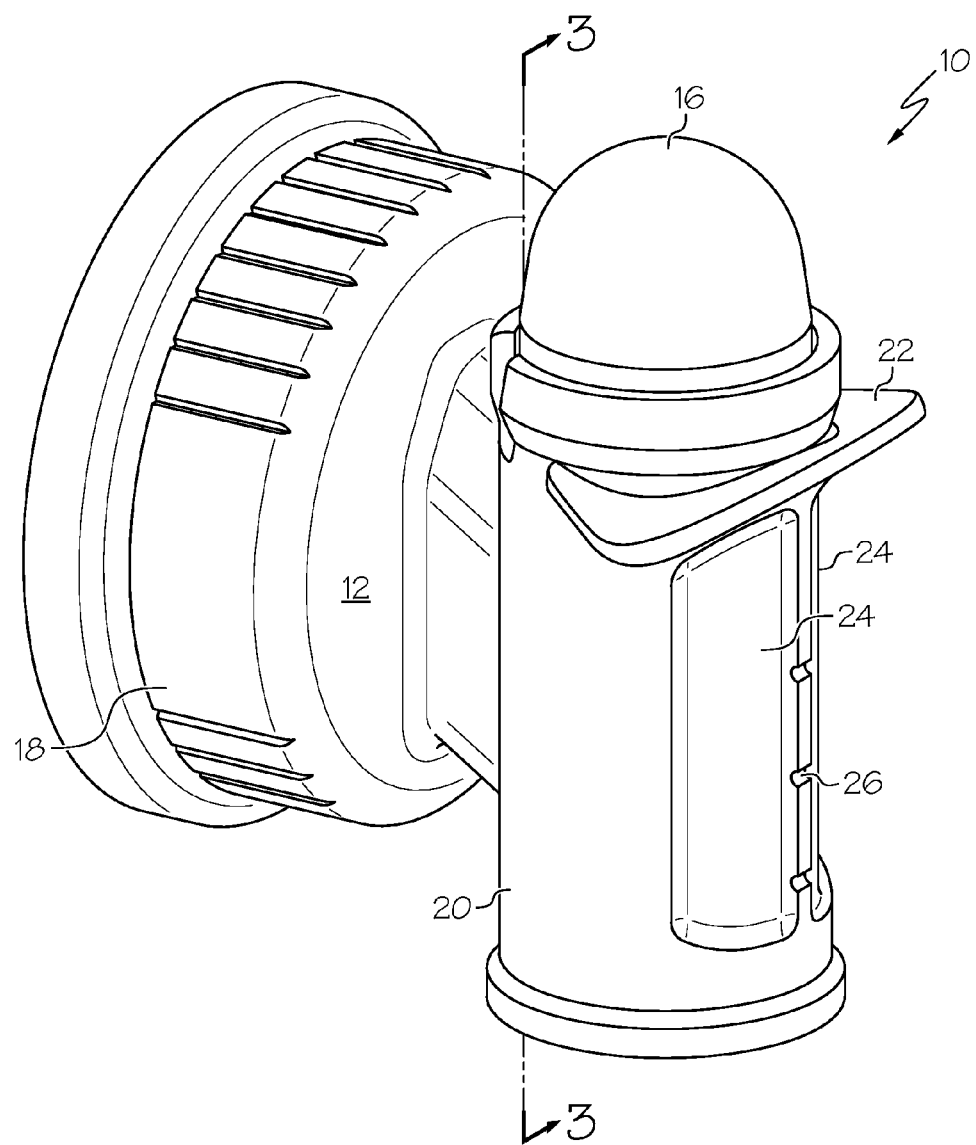
FIG. 1 shows a perspective view of an embodiment of a fluid dispensing assembly.

FIGS. 10A, 10B, and 10D-10F show the fluid dispensing assembly of FIG. 1 having various levels of fluid therein and being dispensed therefrom.

Figure 10A:
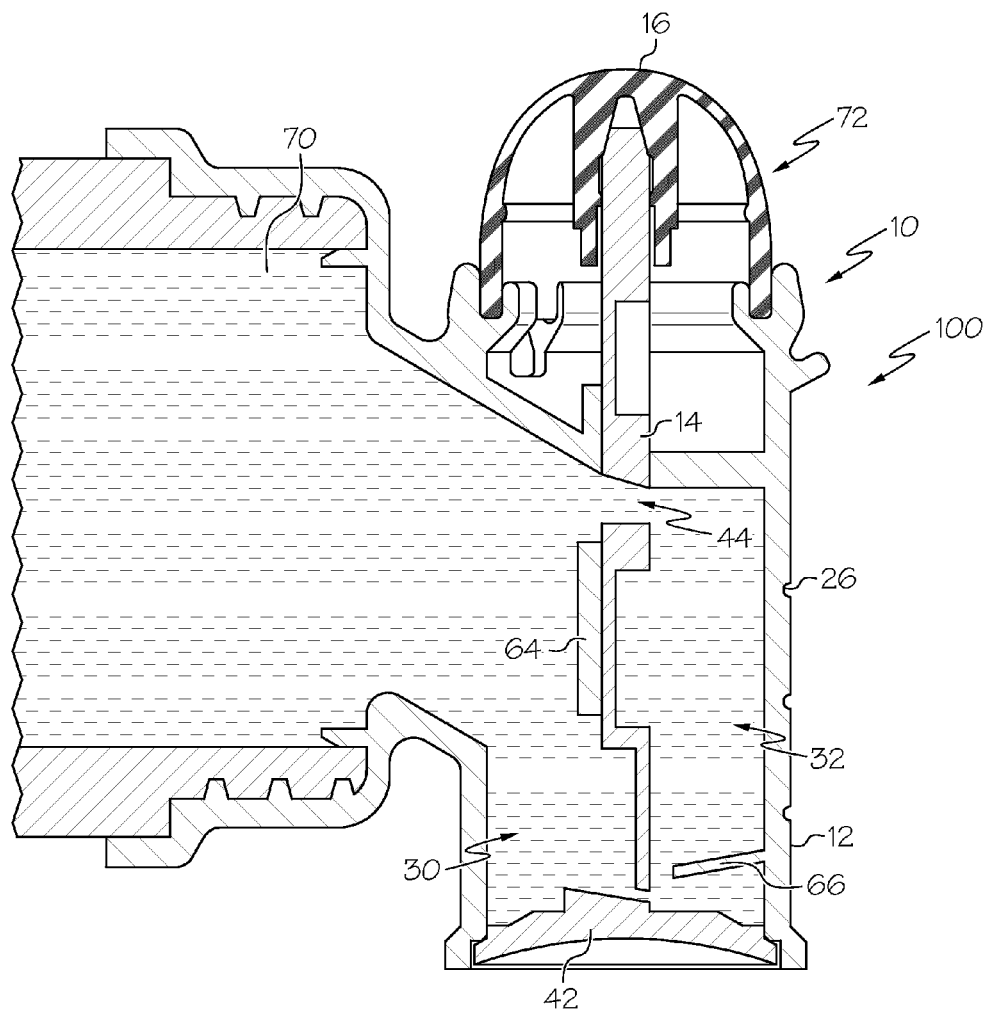
Figure 10B:
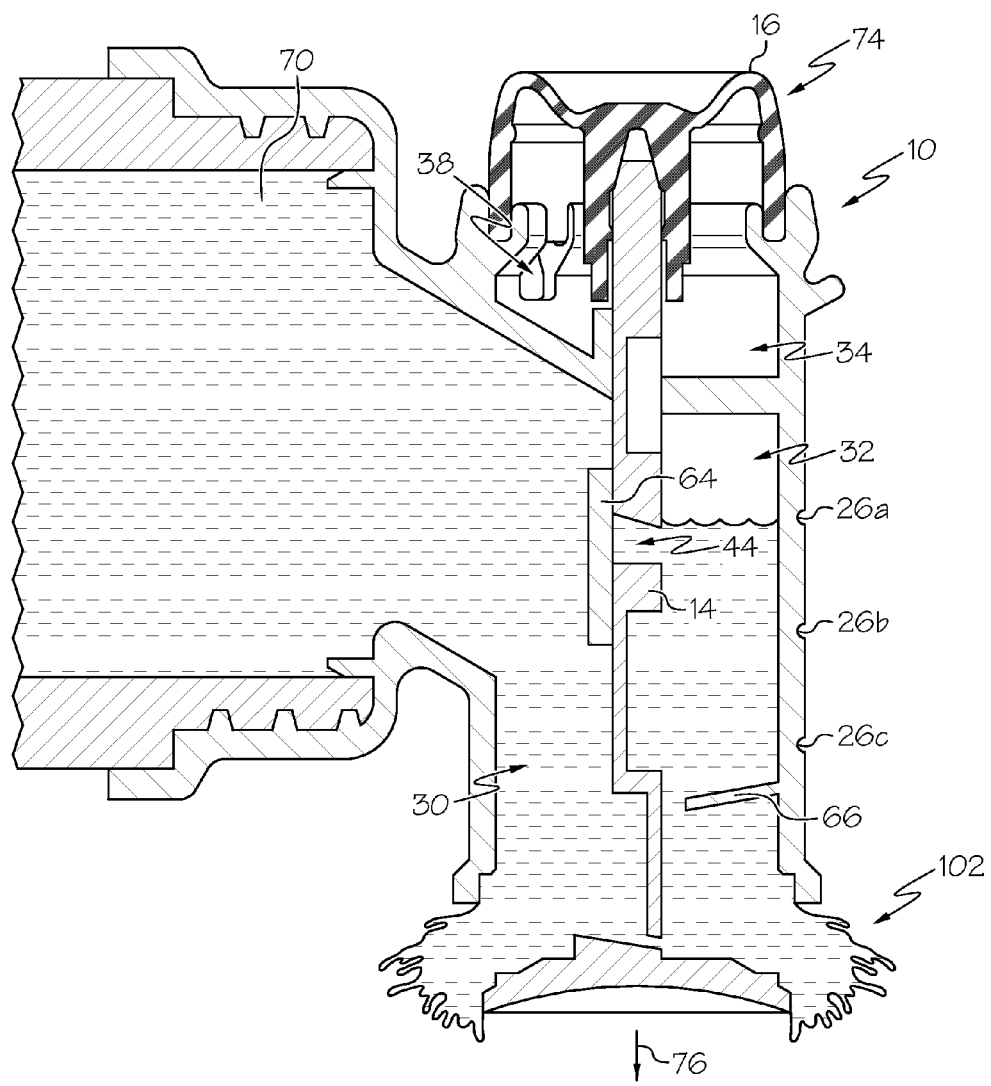
Figure 10C:
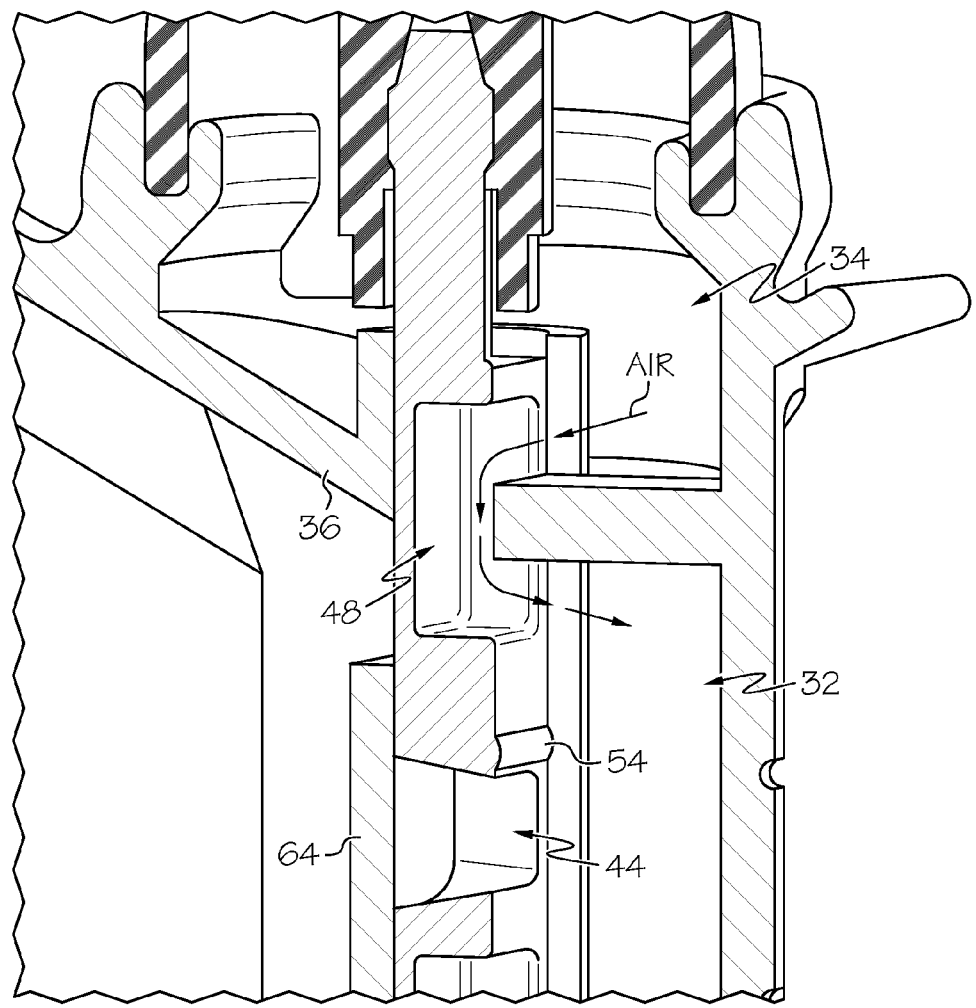

FIG. 10C shows a cutaway detailed view of the fluid dispensing assembly of FIG. 10B.

DETAILED DESCRIPTION OF THE INVENTION

While this invention may be embodied in many different forms, there are described in detail herein one or more specific embodiments. This description is an exemplification of the principles of the invention and is not intended to limit it to the particular embodiments illustrated.

For the purposes of this disclosure, like reference numerals in the figures shall refer to like features unless otherwise indicated.

Figure 2:
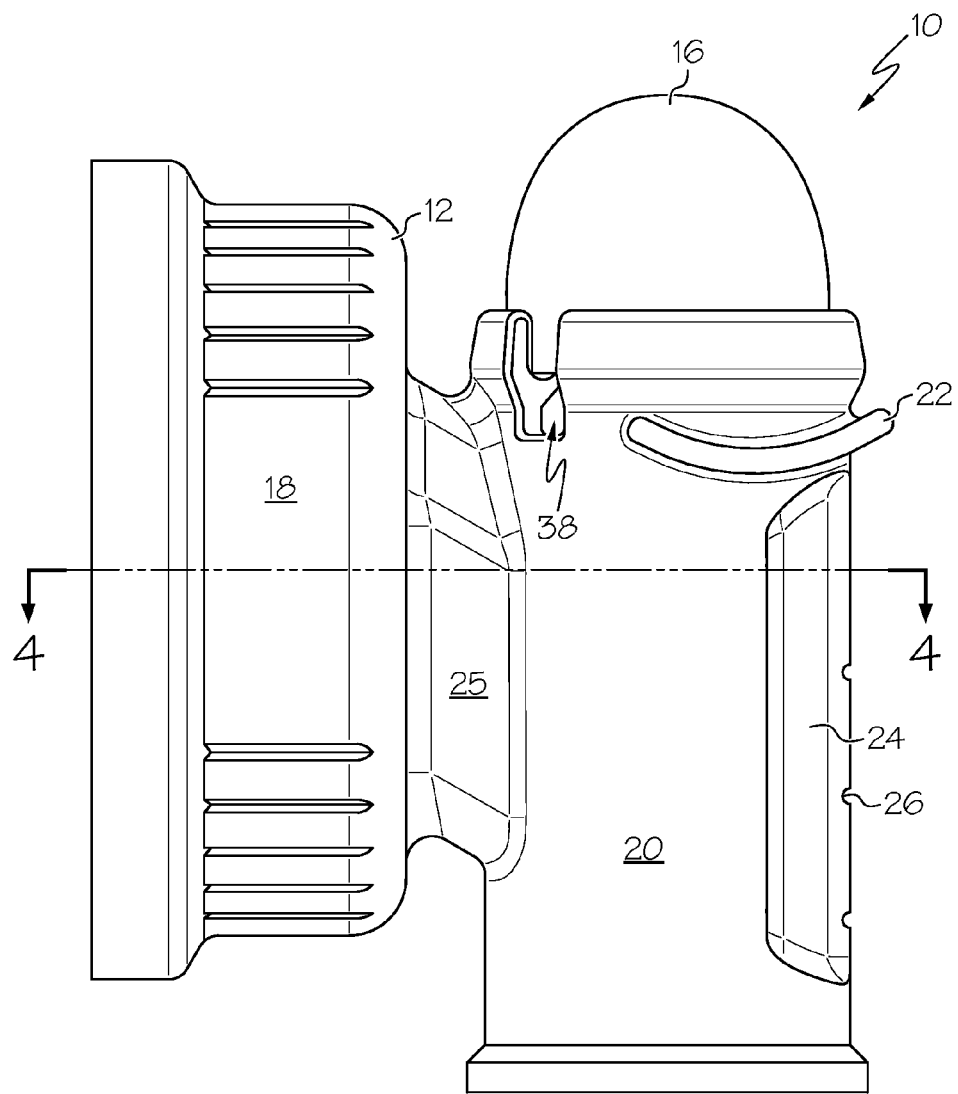
FIG. 2 shows a side view of the fluid dispensing assembly of FIG. 1.

As shown for example in FIGS. 1 and 2, in some embodiments, a fluid dispensing assembly comprises a body 12, a valve 14 (FIG. 3) and a resilient member 16. The body 12 further comprises a container engaging portion 18 and a dispensing portion 20. The fluid dispensing portion 20 comprises finger holds 22.

In some embodiments, the body 12 has one or more portions thereof that are see-through so the operator can view the volume of fluid within the body. In some embodiments, the body 12 can be made from a transparent or translucent material, thereby permitting the operator to see through the body 12. In some embodiments, the body 12 is formed from a generally opaque material but certain portions of the body 12 are sufficiently thin to permit the passage of light therethrough. As shown for example in FIG. 1, the body 12 comprises viewing portions 24, wherein the material forming the body 12 is thin enough for the operator to view whether fluid is present, and to what degree, within the dispensing portion 20. It will be appreciated that the body 12 can comprise any suitable number of viewing portions 24, for example, between one and ten.

In some embodiments, the body 12 further comprises at least one indicator mark 26. Indicator marks 26 show the level of fluid within at least a portion of the dispensing portion 20. Again, it will be appreciated that the dispensing portion 20 can have any suitable number of indicator marks 26, for example between one and ten.

Figure 3:
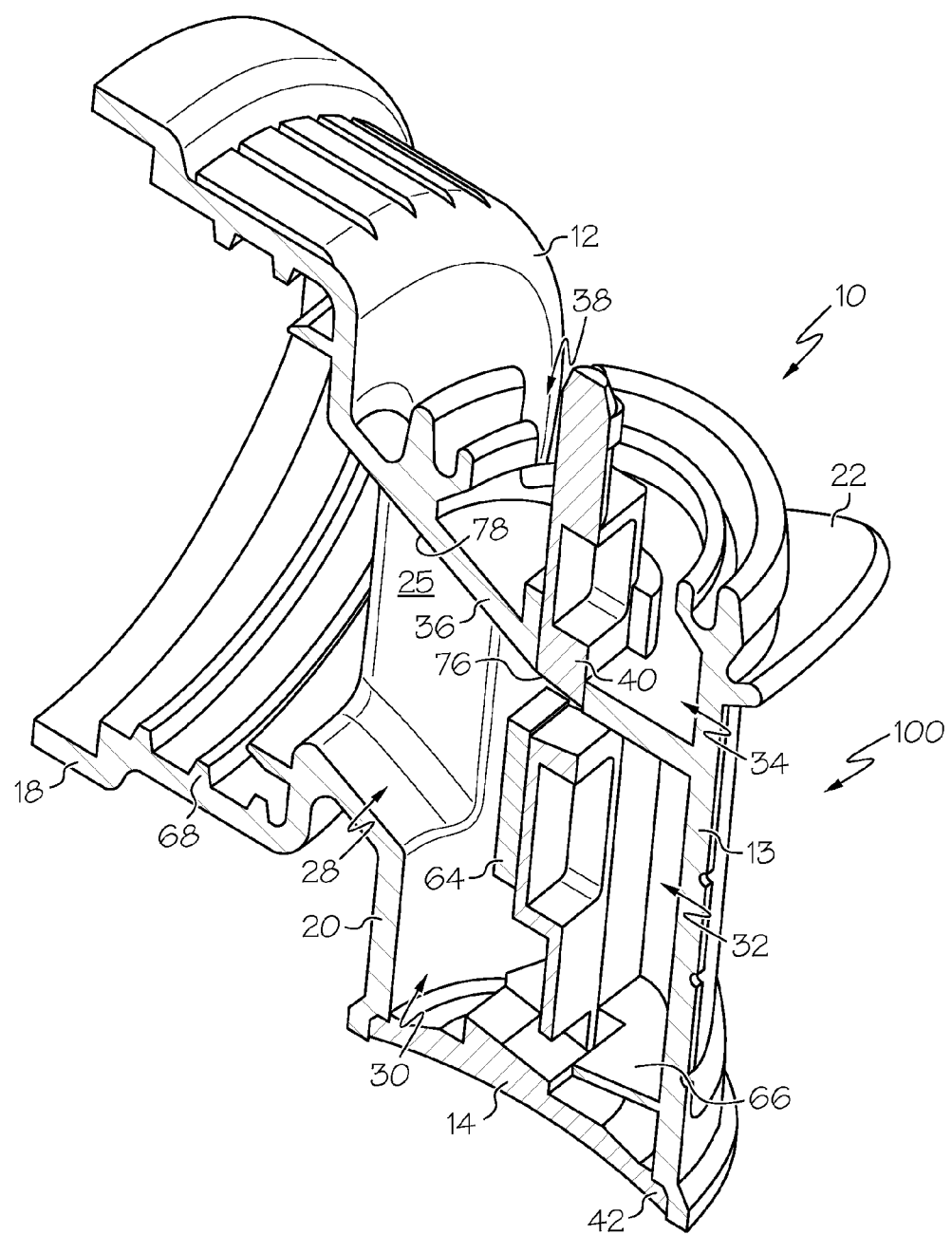
FIG. 3 shows a cutaway view of the fluid dispensing assembly of FIG. 1.

Turning to FIG. 3, a cross-sectional view of the fluid dispensing assembly 10 is shown without the resilient member 16. As shown in FIG. 3, in some embodiments, the body 12 comprises a body wall 13 and a fluid cavity 28 within the body 12. Further, in some embodiments, the fluid cavity 28 defines a first chamber 30 and a second chamber 32. In some embodiments, the body 12 comprises a throat 25 connecting the container engaging portion 18 with the dispensing portion 20 and, in some embodiments, first chamber 30. In some embodiments, the first and second chambers 30, 32, are on opposite sides of the valve 14, for example as shown in FIG. 3. Further, in some embodiments, for example as shown in FIG. 3, the body 12 defines a third chamber 34. The third chamber 34 is bounded by the resilient member 16 (FIG. 1) and the divider 36. With additional regard to FIGS. 2 and 3, in some embodiments, the body 12 defines a port 38, through which air can pass, as is discussed in greater detail below. Moreover, in some embodiments, the body 12 comprises a section member 64, adjacent to valve 14, and a baffle member 66 extending into the second chamber 32.

Figure 5:
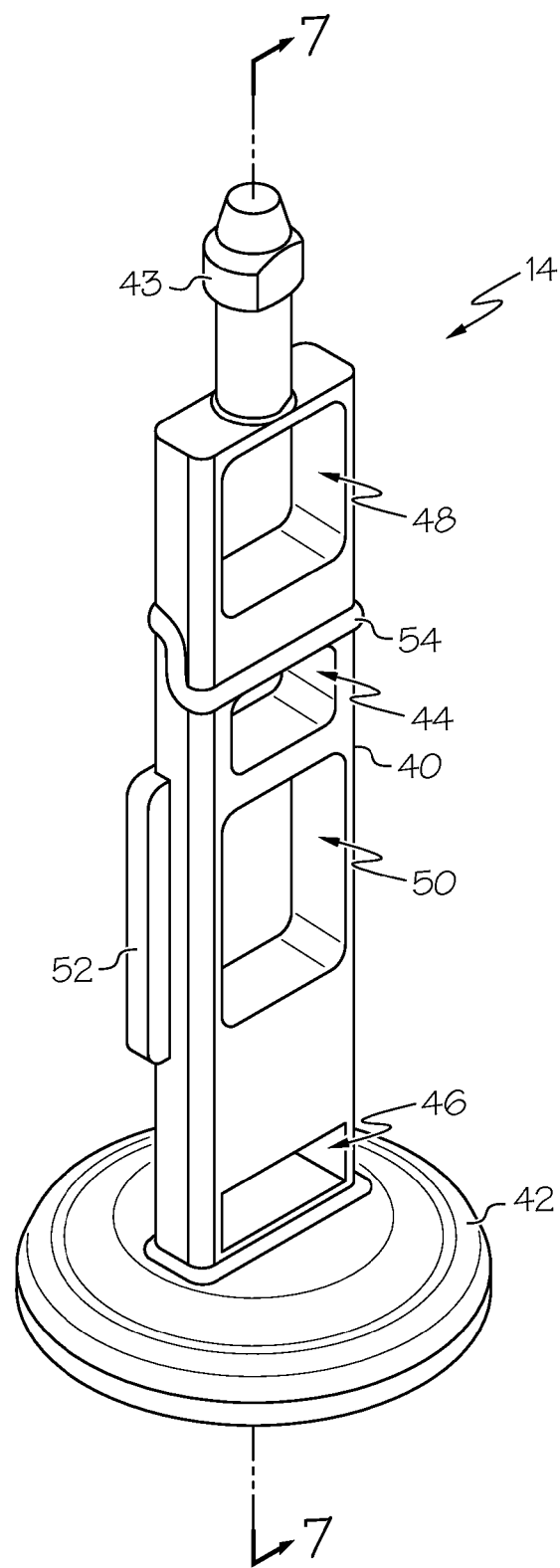
FIG. 5 shows a perspective view of an embodiment of a valve of the fluid dispensing assembly of FIG. 1.
Figure 6:
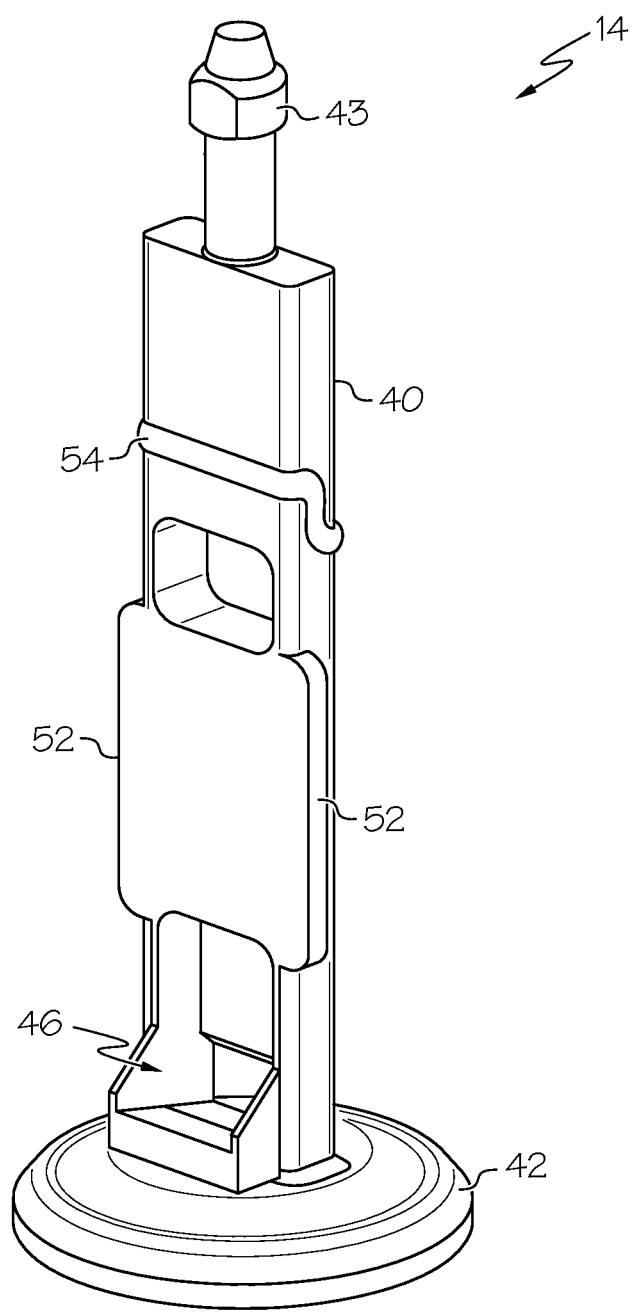
FIG. 6 shows another perspective view of the valve of FIG. 5.
Figure 7:
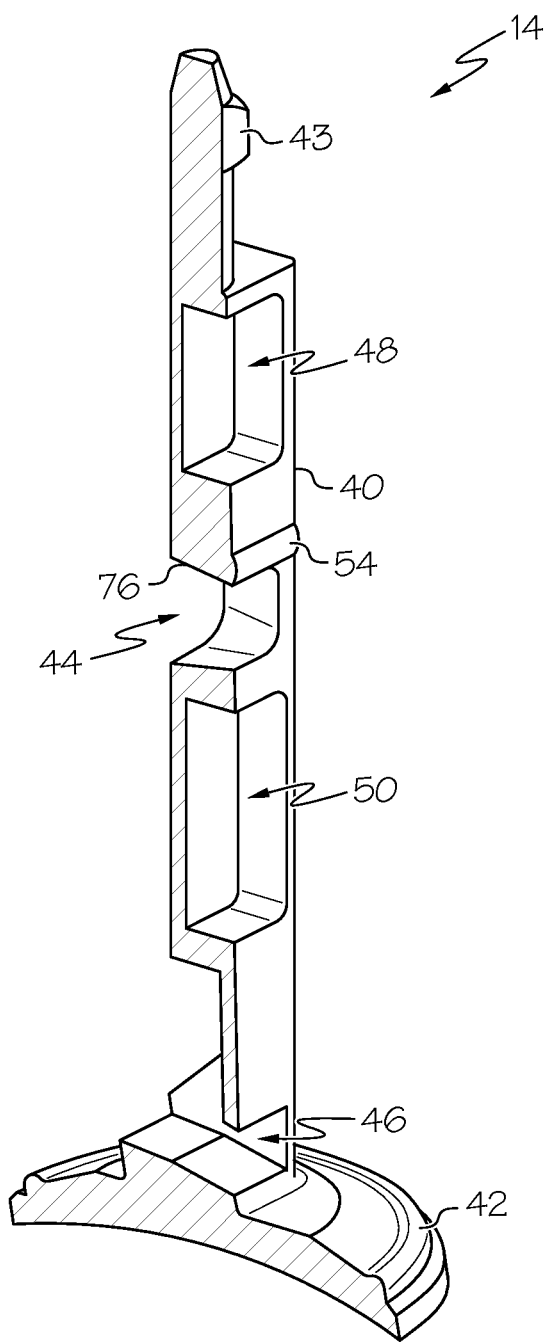
FIG. 7 shows a cutaway view of the valve of FIG. 5.
Figure 9:
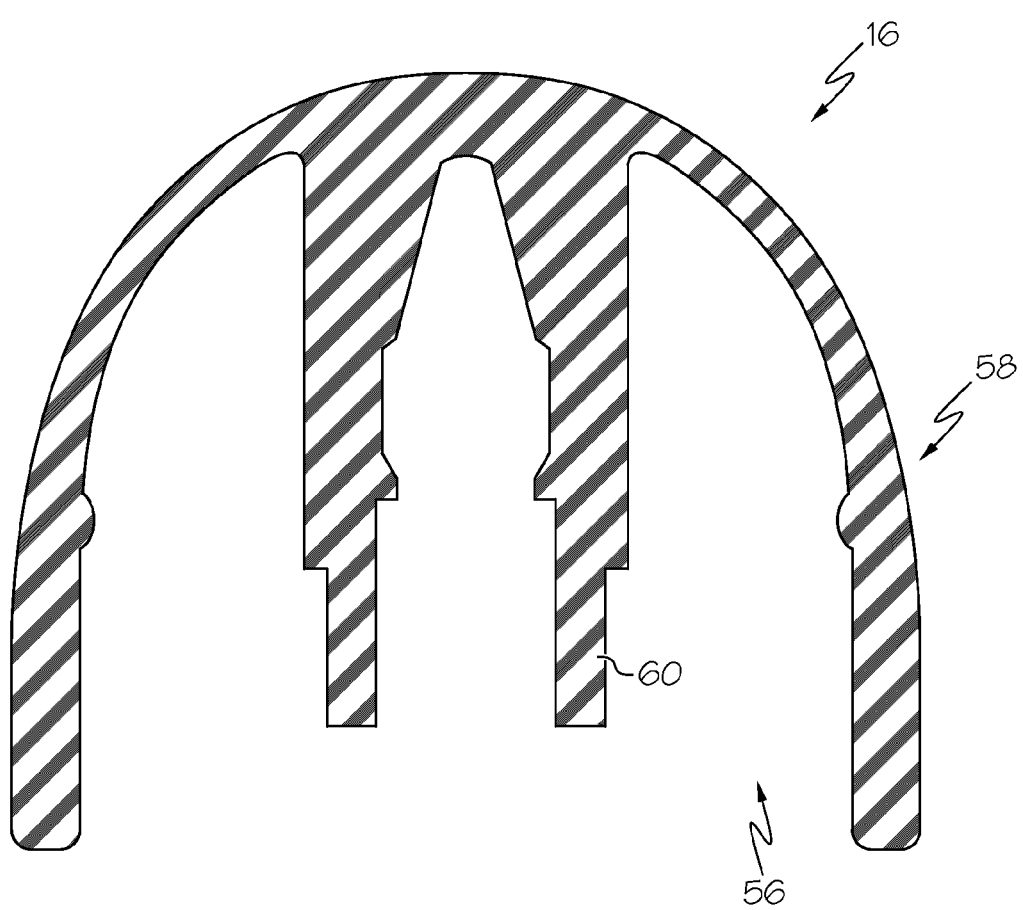
FIG. 9 shows a cross-sectional view of the resilient member of FIG. 8.

Turning to FIGS. 5-7, in some embodiments, a valve 14 comprises a stem 40 and a seal 42. The stem 40 further comprises an engaging portion 43. The engaging portion 43 engages a portion of the resilient member 16 (FIG. 9). Further, the stem 40 defines a first opening 44 and, in some embodiments, a second opening 46. In some embodiments, the stem 40 has a first recessed portion 48 and a second recessed portion 50.

In some embodiments, the valve 14 further comprises at least one guide member 52. In some embodiments, the valve 14 has a raised portion 54. In some embodiments, the raised portion 54 extends around the stem 40 of the valve 14 in order to isolate the third chamber 34 (FIG. 3) from the second chamber 32.

Figure 4:
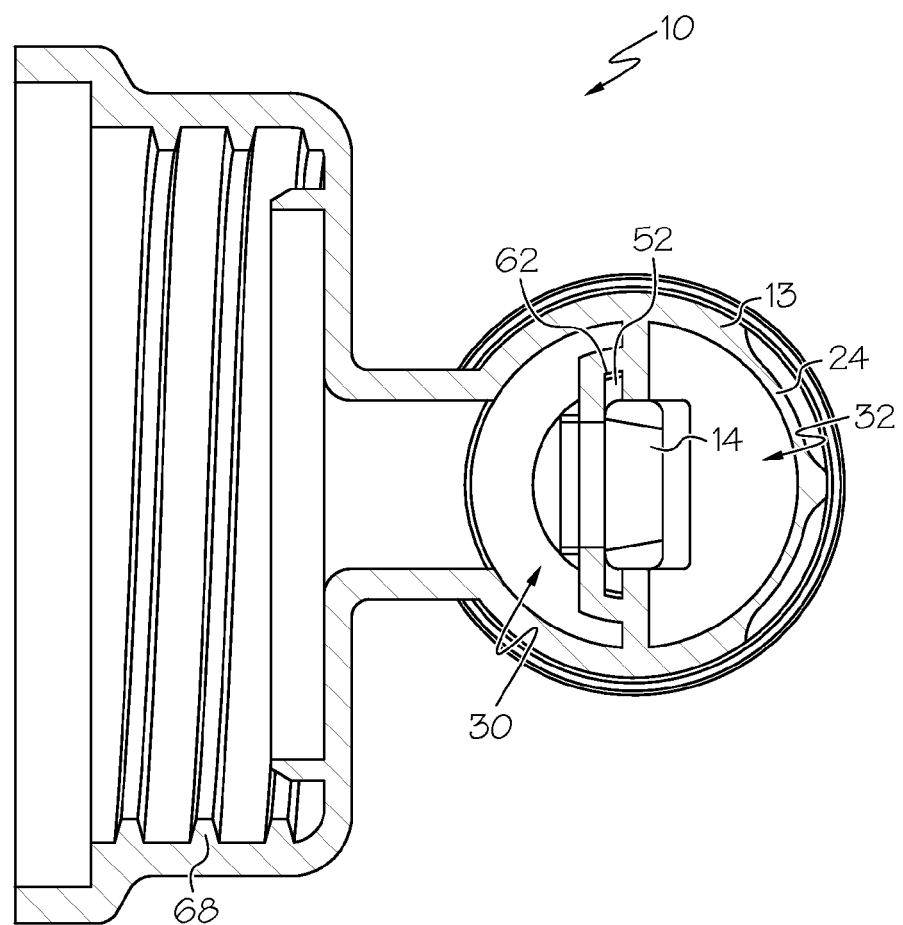
FIG. 4 shows a cutaway view of the fluid dispensing assembly of FIG. 2.

As shown in FIG. 4, in some embodiments, the body 12 comprises a guide channel 62. The guide member 52 is slidable within the guide channel 62 so that the valve 14 can open and close, as discussed in greater detail below.

Figure 8:
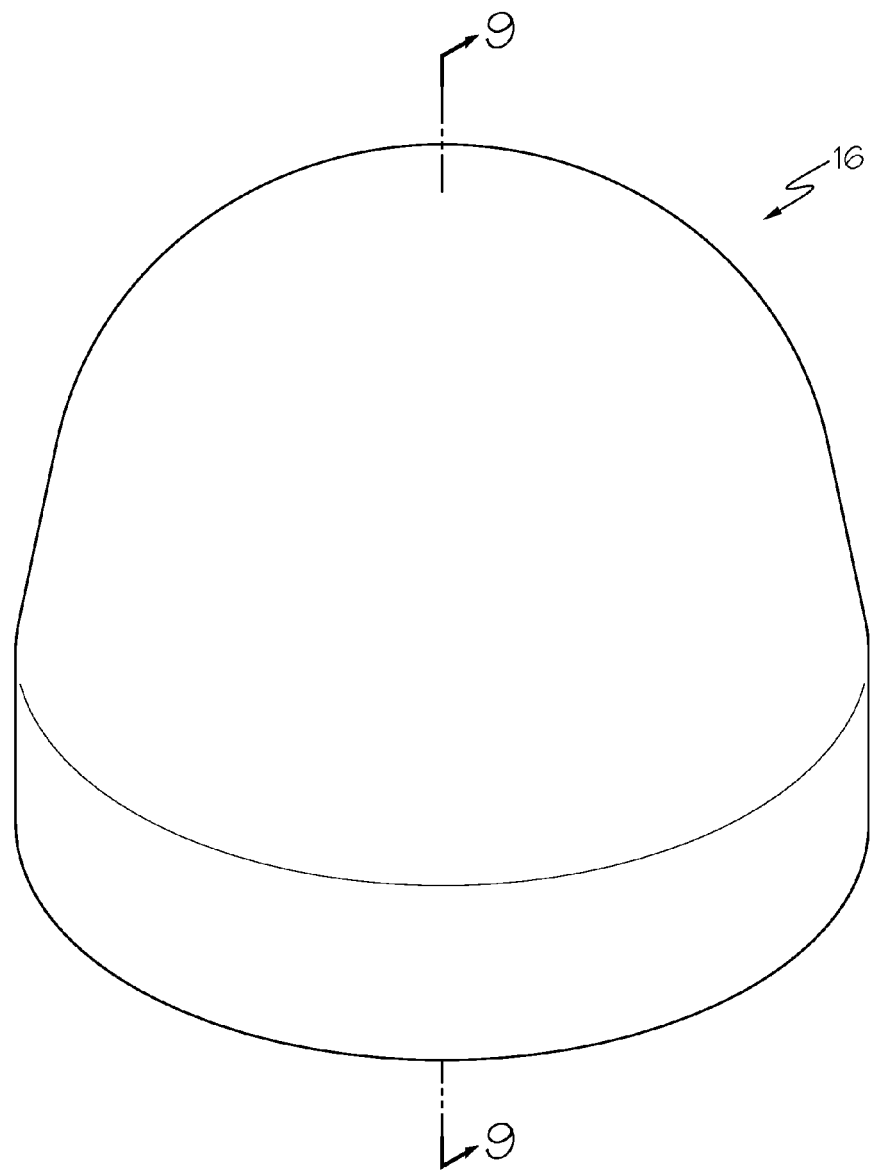
FIG. 8 shows a perspective view of an embodiment of a resilient member of the fluid dispensing assembly of FIG. 1.

With regard to FIGS. 8 and 9, an embodiment of a resilient member 16 is shown therein. FIG. 9 shows the resilient member 16 of FIG. 8 in cross-section. In some embodiments, the resilient member 16 comprises a dome-shaped push button having an interior 56 and an exterior 58. In some embodiments, the interior 56 has a protruding member 60 extending into the open space in the interior 56. In some embodiments, the protruding member 60 is shaped to engage the engaging portion 43 of the valve 14. In this way, the engaging portion 43 is retained within the protruding member 60 of the resilient member 16 and, as the resilient member 16 is actuated, the valve 14 moves in conjunction with the protruding member 60.

Turning to FIGS. 10A-10F, an embodiment of the fluid dispensing assembly 10 is shown in various states of operation. In FIG. 10A, the fluid dispensing assembly 10 is shown in a closed configuration 100. In the closed configuration, the fluid 70 is prevented from flowing out of the fluid dispensing assembly 10 as the seal 42 mates with the body 12 to prevent the passage of fluid 70 therebetween. As further illustrated in FIG. 10A, in the closed configuration 100, the first chamber 30 and the second chamber 32 are in fluid communication, as fluid 70 can flow between the first and second chambers 30, 32 by way of the first opening 44 in the valve 14. Moreover, it will be appreciated that in the closed configuration 100, the resilient member 16 is in an expanded configuration 72.

When viewing the fluid dispensing assembly 10 as shown in FIG. 10A, the operator will notice that the second chamber 32 is full of fluid 70. The operator is able to determine the level of fluid 70 within the second chamber 32 by way of viewing portion(s) 24 (FIG. 1) and indicator marks 26.

With regard to FIGS. 10B and 10C, the fluid dispensing assembly 10 is shown in a flow configuration 102. In the flow configuration 102, the resilient member 16 has been actuated by the operator, is now in a compressed configuration 74, and is elastically deformed. As shown in FIG. 10B, the fluid 70 begins to flow out of the fluid dispensing assembly 10. Further, with actuation of the resilient member 16, the valve 14 moves relative to the body 12 in the direction of arrow 76.

As shown in the FIG. 10B, movement of the valve 14 relative to body 12 isolates the second chamber 32 from the first chamber 30 by positioning the first opening 44 of the valve 14 adjacent to section member 64. This prevents fluid 70 from flowing from the first chamber 30 to the second chamber 32 by way of the first opening 44. Moreover, as shown in FIG. 10B, fluid 70 flows out of both the first chamber 30 and the second chamber 32. As fluid 70 flows out of the second chamber 32, it is not replenished. Consequently, the fluid level decreases, and the operator can view the decreasing level by way of viewing portion(s) 24 (FIG. 1) and indicator marks 26.

As illustrated in the detailed view of FIG. 10C, as the fluid level decreases in the second chamber 32, air passes from the third chamber 34 into the second chamber 32 to equalize the pressure between the second chamber 32 and the third chamber 34, which is at or near the atmospheric air pressure. Specifically, air passes from outside the fluid dispensing assembly 10 into the third chamber 34 by way of port(s) 38, as shown for example in FIGS. 2 and 10B. Air is allowed to flow from the third chamber 34 into the second chamber 32 by way of the first recessed portion 48. For the sake of comparison, and with reference to FIG. 3, when the fluid dispensing assembly is in the closed configuration 100, air is not allowed to pass between the third chamber 34 and the second chamber 32 because the first recessed portion 48 resides entirely within the third chamber 34. Moreover, the divider 36, in combination with the stem 40, prevents passage of air or fluid between the second and third chambers 32, 34. In some embodiments, the stem 40 comprises raised portion(s) 54 (FIGS. 5-7), which promotes sealing between the stem 40 of the valve 14 and divider 36. In some embodiments, it is necessary to isolate the third chamber 34 from the second chamber 32 when the fluid dispensing assembly is in the closed configuration 100 in order to prevent the passage of fluid 70 from the second chamber 32 into the third chamber 34.

As the fluid 70 flows out of the fluid dispensing assembly 10, the ratio of fluid 70 flowing out of the first and second chambers 30, 32, respectively, is fixed. In other words, for a given amount of fluid 70 flowing out of the second chamber 32, a proportional amount of fluid 70 flows out of the first chamber 30. Of course, the baffle member 66 and viscosity of the fluid 70 will also impact the ratio of fluid 70 flowing out of the first and second chambers 30, 32, respectively. Finally, as shown in FIG. 10B, the level of fluid 70 within the second chamber 32 is at a first indicator mark 26a.

Figure 10D:
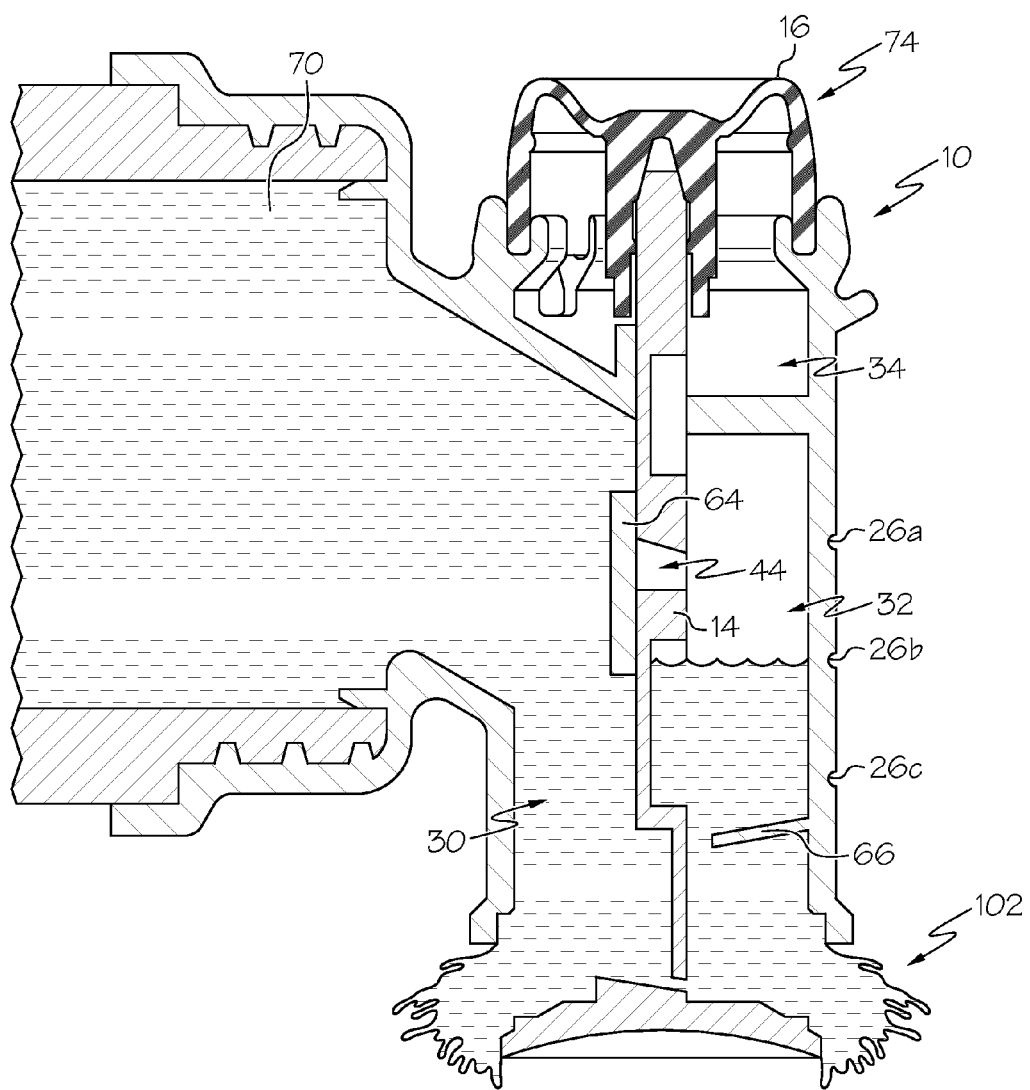

Shown in FIG. 10D, the level of fluid 70 in the second chamber 32 has decreased from that of FIG. 10B. As with FIG. 10B, the fluid 70 of FIG. 10D is prevented from flowing through first opening 44 by section member 64.

Additionally, the operator can view the level of fluid 70 through the viewing portion(s) 24 (FIGS. 2 and 4). As shown in FIG. 10D, the level of fluid within the second chamber 32 is at a second indicator mark 26b. At this point, the operator may decide that the requisite amount of fluid 70 has been dispensed and may wish to stop dispensing fluid 70. In order to stop dispensing fluid 70, the operator can simply stop pressing on the resilient member 16, and the resilient member 16 will return to the expanded configuration 72 (FIG. 10A). It will be appreciated that the resilient member 16 can be released at any time during the dispensing process and fluid 70 will stop flowing from the fluid dispenser assembly 10.

Figure 10E:
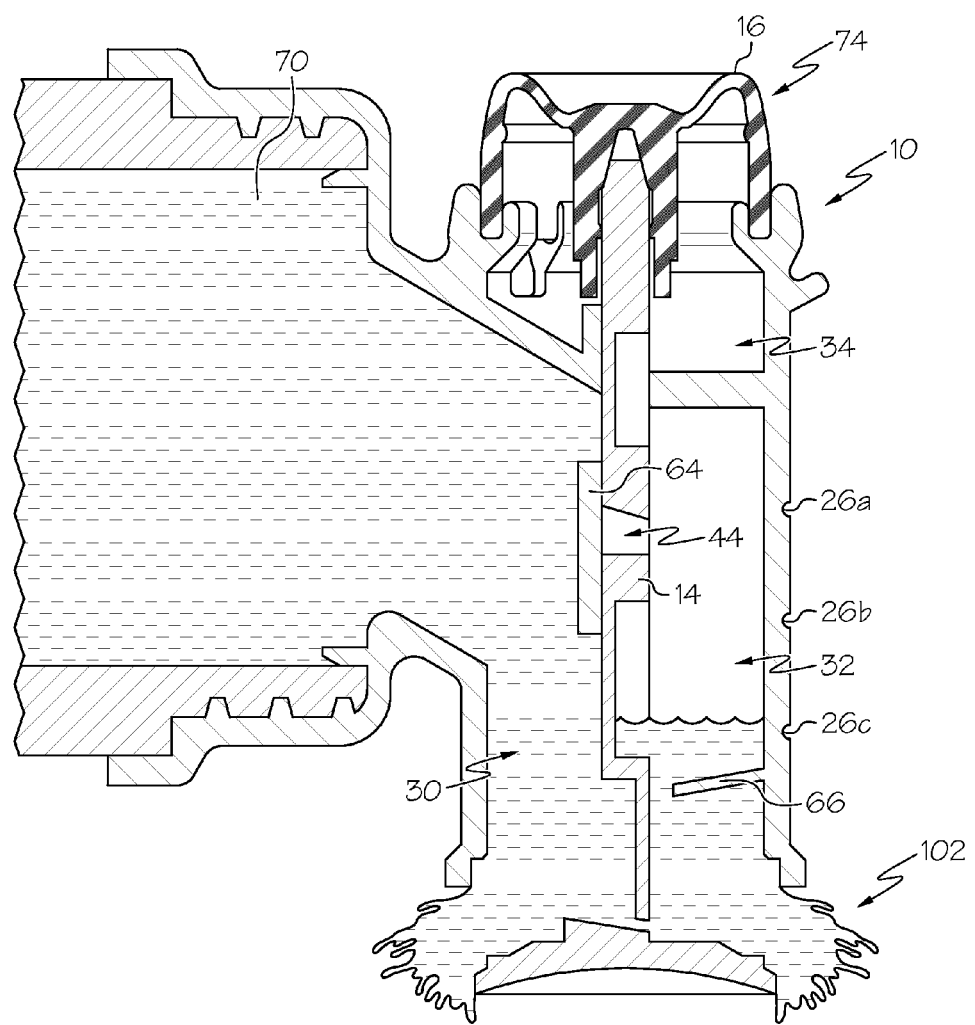

Turning to FIG. 10E, as the resilient member 16 is depressed, the fluid 70 continues to flow from the fluid dispensing assembly 10. In particular, the level of fluid 70 in the second chamber 32 is now at the third indicator mark 26c. In the step illustrated by FIG. 10E, as with FIGS. 10B and 10D, air continues to flow from the third chamber 34 into the second chamber 32 to equalize the pressure with that of the outside atmosphere.

Figure 10F:
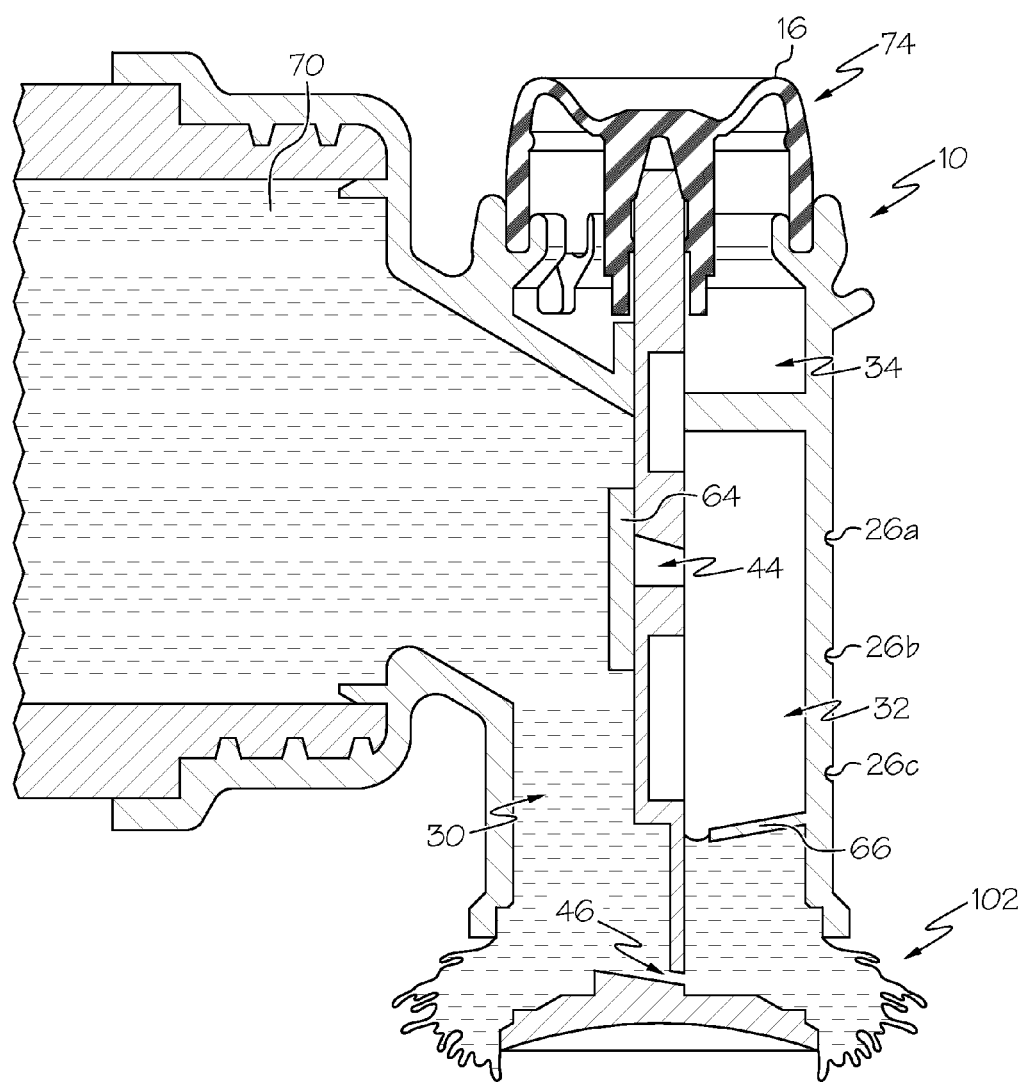

With regard to FIG. 10F, the fluid 70 in the second chamber 32 is now shown below the third indicator mark 26c, and generally in-line with the baffle member 66. Even after the fluid 70 has been evacuated from the second chamber 32, it is still able to flow out of the first chamber 30. In this way, the operator can continue to dispense fluid 70 as desired. Moreover, fluid 70 is permitted to flow through the second opening 46. In some embodiments, the baffle member 66 prevents fluid 70 from flowing upwardly into the second chamber 32.

After the operator has dispensed the desired amount of fluid 70, the resilient member 16 is released and allowed to return to the expanded configuration 72 (FIG. 10A). Releasing the resilient member 16 pulls the valve 14 upwardly, stopping flow of the fluid 70 out of the fluid dispensing assembly 10. The fluid 70 is again allowed to flow from the first chamber 30 to the second chamber 32 via the first opening 44, thereby refilling the second chamber 32, as shown in FIG. 10A. Further, in order to refill the second chamber 32, the air remaining in the second chamber 32 must be removed therefrom. Referring to FIG. 3, in order for the air to flow from the second chamber 32 into the first chamber 30, and subsequently through the throat 25 and into the container for venting, the first opening 44 of the valve 14 has an upwardly sloped surface 76. Additionally, in some embodiments, the throat 25 has an ascending surface 78, along which the air moves from the first chamber 30 into the container (not shown). The air is then vented through a vent in the container into the atmosphere. In this way, after dispensing fluid 70 (FIG. 10F), the upwardly sloped surface 76 (FIG. 3) and the ascending surface 78 allow the air in the second chamber 32 to vent out of the fluid dispensing assembly 10, thereby permitting the second chamber 32 to be refilled with fluid 70. In addition to the foregoing, any suitable shaped surface(s) that permit(s) air to vent from the second chamber 32 into the container are permissible.

Therefore, in some embodiments, the fluid dispensing assembly 10 is used with a container that is externally vented. That is, the container used with the fluid dispensing assembly 10 has its own air vent.

As described herein, the fluid dispensing assembly 10 provides the operator with real-time feedback as to the amount of fluid being dispensed. In some embodiments, the fluid dispensing assembly 10 can be used to dispense detergent, including laundry detergent, edible oils, or any other desired liquid.

Returning to FIG. 4, it will be appreciated that the body 12 can be attached to a container, for example, by way of threads 68. Other fasteners can also be used, for example, a snap fit, press fit, or any other suitable fastening mechanism. Moreover, the fluid dispensing assembly 10 can be used with a rigid container or non-rigid container.

In some embodiments, the body 12 is formed form a suitable polymeric material, for example, polypropylene. Further, in some embodiments, the resilient member 16 is formed form a suitable rubber or polymeric material, for example, a thermoplastic elastomer. Finally, in some embodiments, the valve 14 is formed form a suitable polymeric material, for example high-density polyethylene. Other suitable materials for each of the body 12, resilient member 16, and valve 14 are permissible.

In some embodiments, the invention is directed a method or methods of using a fluid dispensing assembly 10. To that end, and with respect to the figures herein, for example FIGS. 10A-10F, it will be appreciated that an operator can dispense fluid 70 from the fluid dispensing assembly 10 by pressing the resilient member 16 and allowing fluid to flow from the first and second chambers 30, 32. While dispensing fluid 70, the operator can be viewing the level of fluid in the second chamber 32 by way of one or more viewing portions 24.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the invention. Those skilled in the art may recognize other equivalents to the specific embodiment described herein which equivalents are intended to be encompassed by the claims attached hereto.

What is claimed is:

1. A fluid dispensing assembly comprising:
   a body having a fluid cavity therein, the body comprising a body wall, the body wall having at least a portion thereof that is transparent or translucent, thereby permitting the operator to see the level of fluid within at least a portion of the fluid cavity;
   a valve disposed within the body, the valve comprising a seal, the seal selectively engaged to the body; and
   a resilient member, the resilient member being elastically deformable; wherein the valve is attached to the resilient member with the resilient member being attached to an exterior of said body;
   wherein the fluid cavity defines a first chamber and a second chamber, the first and second chambers being in fluid communication when the fluid dispensing assembly is in the closed configuration, and
   wherein the second chamber is isolated from the first chamber when the fluid dispensing assembly is in the flow configuration and both the first chamber and second chamber are opened to dispense fluid when said valve is opened.

2. The fluid dispensing assembly of claim 1, wherein the valve further comprises a stem, at least a portion of the stem engaged to the resilient member.

3. The fluid dispensing assembly of claim 2, wherein the stem has a first opening therein.

4. The fluid dispensing assembly of claim 3, wherein the stem has a second opening therein, the second opening longitudinally offset from the first opening along the length of the stem.

5. The fluid dispensing assembly of claim 2, wherein the stem comprises at least one guide member.

6. The fluid dispensing assembly of claim 5, wherein the body comprises at least one guide channel, the at least one guide member slidable within the at least one guide channel.

7. The fluid dispensing assembly of claim 2, wherein the stem comprises a first recessed portion and a second recessed portion, the second recessed portion being longitudinally offset from the first recessed portion along the length of the stem.

8. The fluid dispensing assembly of claim 1, wherein the resilient member comprises a dome-shaped push button.

9. The fluid dispensing assembly of claim 8, wherein the dome-shaped push button has an interior and an exterior, the interior having a protruding member extending therefrom.

10. The fluid dispensing assembly of claim 1 having a closed configuration and a flow configuration.

11. The fluid dispensing assembly of claim 1, wherein the second chamber is vented when the fluid dispensing assembly is in the flow configuration.

12. The fluid dispensing assembly of claim 11, wherein the body further defines a third chamber, the second chamber venting through the third chamber when the fluid dispensing assembly is in the flow configuration.

13. The fluid dispensing assembly of claim 12, wherein the second chamber is isolated from the third chamber when the fluid dispensing assembly is in the closed configuration.

14. A fluid dispensing assembly having a flow configuration and a closed configuration, the fluid dispensing assembly comprising:
   a body having a fluid cavity therein, the body has a first chamber, a second chamber, and a body wall, the body wall extending along at least a portion of the second chamber, the body wall extending along at least a portion of the second chamber having at least a portion thereof that is transparent or translucent such that the level of fluid within the second chamber is visible from outside of the second chamber;
   a valve disposed within the body, the valve isolating the first chamber from the second chamber when the assembly is in the flow configuration and allowing fluid within the first chamber and second chamber to flow out of said valve when in the flow configuration, the valve comprising a seal and a stem, the seal selectively engaged to the body; and a resilient member, the resilient member being elastically deformable; wherein the valve is attached to a portion of the stem;

wherein, in the closed configuration, the first and second chambers are in fluid communication with one another;

wherein the valve has a first opening extending therethrough, and wherein in the closed configuration the first opening allowing for fluid communication between the first and second chambers; and wherein the body further has a third chamber, the second chamber being vented through the third chamber when the assembly is in the flow configuration.

15. The fluid dispensing assembly of claim 14, wherein the second chamber is vented through the first chamber when the assembly is in the closed configuration.

\* \* \* \* \*